(12) United States Patent
Pietila et al.

(10) Patent No.: US 10,133,535 B2
(45) Date of Patent: Nov. 20, 2018

(54) SYSTEMS AND METHODS FOR OUTPUTTING ENGINE SOUND WHEN ENGINE IS OFF

(71) Applicant: GM Global Technology Operations LLC, Detroit, MI (US)

(72) Inventors: Glenn Pietila, Howell, MI (US); Scott M. Reilly, Southfield, MI (US); Frank C. Valeri, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 11 days.

(21) Appl. No.: 15/430,099

(22) Filed: Feb. 10, 2017

(65) Prior Publication Data
US 2018/0232196 A1    Aug. 16, 2018

(51) Int. Cl.
| | |
|---|---|
| *G06F 19/00* | (2018.01) |
| *G06F 3/16* | (2006.01) |
| *H04R 3/12* | (2006.01) |
| *F02D 41/04* | (2006.01) |
| *F02D 41/06* | (2006.01) |
| *F02D 41/26* | (2006.01) |
| *F02D 41/30* | (2006.01) |

(52) U.S. Cl.
CPC ............. *G06F 3/16* (2013.01); *F02D 41/042* (2013.01); *F02D 41/065* (2013.01); *F02D 41/26* (2013.01); *F02D 41/3005* (2013.01); *H04R 3/12* (2013.01); *F02D 2200/501* (2013.01); *H04R 2499/13* (2013.01)

(58) Field of Classification Search
CPC ......... B60W 10/06; B60W 20/10; H03F 3/68; H04R 1/227; H04R 1/403
USPC .... 701/36, 99, 101, 106; 381/71.4, 73.1, 86, 381/302, 28, 57
See application file for complete search history.

(56) References Cited

U.S. PATENT DOCUMENTS

| | | | |
|---|---|---|---|
| 9,227,566 B2 | 1/2016 | Valeri et al. | |
| 9,347,388 B2 | 5/2016 | Bohn et al. | |
| 9,981,617 B1* | 5/2018 | MacDonald | ........ B60R 16/0231 |
| 10,015,596 B1* | 7/2018 | Claywell | .................. H04R 3/12 |

OTHER PUBLICATIONS

U.S. Appl. No. 15/245,331, filed Aug. 24, 2016, Valeri et al.
U.S. Appl. No. 15/245,334, filed Aug. 24, 2016, Reilly et al.
U.S. Appl. No. 15/427,999, filed Feb. 8, 2017, Valeri.
U.S. Appl. No. 15/245,400, Valeri et al., filed Aug. 24, 2016.

\* cited by examiner

*Primary Examiner* — John Kwon

(57) ABSTRACT

When the engine is off and not combusting fuel for one of an auto-stop portion of an auto-stop/start event and operation in a sail mode, a selection module sets at least one of: a selected torque based on a pseudo torque output of the engine; and a selected engine speed based on a pseudo engine speed determined for the one of the auto-stop portion of the auto-stop/start event and the operation in the sail mode. A sound control module, based on the at least one of the selected engine speed and the selected torque, sets at least one of: a frequency at which to output a predetermined engine sound; and a magnitude for outputting the predetermined engine sound at the frequency. An audio driver module applies power to at least one speaker of the vehicle to output the predetermined engine sound at the frequency and the magnitude.

20 Claims, 4 Drawing Sheets

SYSTEMS AND METHODS FOR OUTPUTTING ENGINE SOUND WHEN ENGINE IS OFF

FIELD

The present disclosure relates to audio systems of vehicles and more particularly to systems and methods for outputting engine sound via audio systems of vehicles.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some motor vehicles include conventional powertrains having an internal combustion engine and a drivetrain that normally emit sounds during acceleration events, deceleration events, and gear changes. Many consumers have come to rely on these normal sounds as a sign of proper vehicle function. Changes in these normal sounds may indicate, to certain consumers, that the internal combustion engine and/or the drivetrain may be functioning differently than expected.

Some consumers may have expectations as to what the normal sounds of different types of vehicle should be. For example, a consumer may expect certain sounds from "high performance" vehicles, while some sounds may not be expected from other types of vehicles. An absence of expected sounds may detract from a user's enjoyment of a vehicle.

SUMMARY

An audio control system of a vehicle is described. When an engine is combusting air and fuel within cylinders of the engine, a selection module sets at least one of: (i) a selected torque based on a present torque output of the engine; and (ii) a selected engine speed based on a present engine speed. When the engine is off and not combusting fuel for one of (a) an auto-stop portion of an auto-stop/start event and (b) operation in a sail mode, the selection module sets at least one of: (i) the selected torque based on a pseudo torque output of the engine; and (ii) the selected engine speed based on a pseudo engine speed determined for the one of (a) the auto-stop portion of the auto-stop/start event and (b) the operation in the sail mode. A sound control module, based on the at least one of the selected engine speed and the selected torque, sets at least one of: (i) a frequency at which to output a predetermined engine sound; and (ii) a magnitude for outputting the predetermined engine sound at the frequency. An audio driver module applies power to at least one speaker of the vehicle to output the predetermined engine sound at the frequency and the magnitude.

In further features, during the one of (a) the auto-stop portion of the auto-stop/start event and (b) the operation in the sail mode, the sound control module sets at least one of the frequency and the magnitude further based on a randomization parameter determined based on a randomization function.

In further features, the randomization function is a Chaos function.

In further features, a system of the vehicle includes the audio control system an engine control module that initiates the operation in the sail mode when a vehicle speed is greater than a predetermined speed that is greater than zero and an accelerator pedal position is in a predetermined position indicative of an accelerator pedal not being depressed, and that disables fueling of the engine during operation in the sail mode.

In further features, a system of the vehicle includes the audio control system and an engine control module that initiates the auto-stop portion of the auto-stop/start event when a vehicle speed is zero and a brake pedal position is not in a predetermined position indicative of a brake pedal not being depressed, and that disables fueling of the engine during operation in the auto-stop portion of the auto-stop/start event.

In further features, a pseudo parameter module, during the auto-stop portion of the auto-stop/start event, sets at least one of the pseudo engine torque and the pseudo engine speed based on at least one of a predetermined idle engine speed and a predetermined idle engine torque.

In further features, a pseudo parameter module, during the operation in the sail mode, selectively decreases at least one of the pseudo engine torque and the pseudo engine speed as a vehicle speed decreases.

In further features, the pseudo parameter module, during operation in the sail mode, selectively increases at least one of the pseudo engine torque and the pseudo engine speed when the vehicle speed is within a predetermined vehicle speed range associated with a gear shift of a transmission.

In further features, the sound control module, when the selected engine speed is a first engine speed, sets the: (i) the frequency at which to output the predetermined engine sound to a first frequency; and (ii) the magnitude for outputting the predetermined engine sound at the frequency to a first magnitude. The sound control module also at least one of: when the selected engine speed is a second engine speed that is less than the first engine speed, sets the: (i) the frequency at which to output the predetermined engine sound to a second frequency that is less than the first frequency; and (ii) the magnitude for outputting the predetermined engine sound at the frequency to a second magnitude; and, when the selected engine speed is a third engine speed that is greater than the first engine speed, sets the: (i) the frequency at which to output the predetermined engine sound to a third frequency that is greater than the first frequency; and (ii) the magnitude for outputting the predetermined engine sound at the frequency to a third magnitude.

In further features, the sound control module, when the selected torque output is a first torque, sets the: (i) the frequency at which to output the predetermined engine sound to a first frequency; and (ii) the magnitude for outputting the predetermined engine sound at the frequency to a first magnitude. The sound control module also at least one of: when the selected torque output is a second torque that is less than the first torque, sets the: (i) the frequency at which to output the predetermined engine sound to a second frequency; and (ii) the magnitude for outputting the predetermined engine sound at the frequency to a second magnitude that is less than the first magnitude; and, when the selected torque output is a third torque that is greater than the first torque, sets the: (i) the frequency at which to output the predetermined engine sound to a third frequency; and (ii) the magnitude for outputting the predetermined engine sound at the frequency to a third magnitude that is greater than the first magnitude.

An audio control method for a vehicle includes: when an engine is combusting air and fuel within cylinders of the engine, setting at least one of: (i) a selected torque based on a present torque output of the engine; and (ii) a selected engine speed based on a present engine speed; and, when the engine is off and not combusting fuel for one of (a) an auto-stop portion of an auto-stop/start event and (b) operation in a sail mode, setting at least one of: (i) the selected torque based on a pseudo torque output of the engine; and (ii) the selected engine speed based on a pseudo engine speed determined for the one of (a) the auto-stop portion of the auto-stop/start event and (b) the operation in the sail mode; based on the at least one of the selected engine speed and the selected torque, setting at least one of: (i) a frequency at which to output a predetermined engine sound; and (ii) a magnitude for outputting the predetermined engine sound at the frequency; and applying power to at least one speaker of the vehicle to output the predetermined engine sound at the frequency and the magnitude.

In further features, setting at least one of the frequency and the magnitude further includes, during the one of (a) the auto-stop portion of the auto-stop/start event and (b) the operation in the sail mode, setting at least one of the frequency and the magnitude further based on a randomization parameter determined based on a randomization function.

In further features, the randomization function is a Chaos function.

In further features, the audio control method further includes: initiating the operation in the sail mode when a vehicle speed is greater than a predetermined speed that is greater than zero and an accelerator pedal position is in a predetermined position indicative of an accelerator pedal not being depressed; and disabling fueling of the engine during operation in the sail mode.

In further features, the audio control method further includes: initiating the auto-stop portion of the auto-stop/start event when a vehicle speed is zero and a brake pedal position is not in a predetermined position indicative of a brake pedal not being depressed; and disabling fueling of the engine during operation in the auto-stop portion of the auto-stop/start event.

In further features, the audio control method further includes, during the auto-stop portion of the auto-stop/start event, setting at least one of the pseudo engine torque and the pseudo engine speed based on at least one of a predetermined idle engine speed and a predetermined idle engine torque.

In further features, the audio control method further includes, during the operation in the sail mode, selectively decreasing at least one of the pseudo engine torque and the pseudo engine speed as a vehicle speed decreases.

In further features, the audio control method further includes, during operation in the sail mode, selectively increasing at least one of the pseudo engine torque and the pseudo engine speed when the vehicle speed is within a predetermined vehicle speed range associated with a gear shift of a transmission.

In further features, the audio control method further includes: when the selected engine speed is a first engine speed, setting the: (i) the frequency at which to output the predetermined engine sound to a first frequency; and (ii) the magnitude for outputting the predetermined engine sound at the frequency to a first magnitude; and at least one of: when the selected engine speed is a second engine speed that is less than the first engine speed, setting the: (i) the frequency at which to output the predetermined engine sound to a second frequency that is less than the first frequency; and (ii) the magnitude for outputting the predetermined engine sound at the frequency to a second magnitude; and when the selected engine speed is a third engine speed that is greater than the first engine speed, setting the: (i) the frequency at which to output the predetermined engine sound to a third frequency that is greater than the first frequency; and (ii) the magnitude for outputting the predetermined engine sound at the frequency to a third magnitude.

In further features, the audio control method further includes: when the selected torque output is a first torque, setting the: (i) the frequency at which to output the predetermined engine sound to a first frequency; and (ii) the magnitude for outputting the predetermined engine sound at the frequency to a first magnitude; and at least one of: when the selected torque output is a second torque that is less than the first torque, setting the: (i) the frequency at which to output the predetermined engine sound to a second frequency; and (ii) the magnitude for outputting the predetermined engine sound at the frequency to a second magnitude that is less than the first magnitude; and when the selected torque output is a third torque that is greater than the first torque, setting the: (i) the frequency at which to output the predetermined engine sound to a third frequency; and (ii) the magnitude for outputting the predetermined engine sound at the frequency to a third magnitude that is greater than the first magnitude.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines of vehicles combust air and fuel within cylinders. An engine control module (ECM) controls engine actuators, for example, based on a driver torque request. A vehicle may also include one or more motor generator units (MGUS) that can be used to perform different functions at different times. For example, an MGU can be used (i) to output torque to a powertrain of the vehicle and (ii) to impose a load on the powertrain of the vehicle to convert mechanical energy into electrical energy, for example, for regeneration.

The ECM may shut down and maintain the engine OFF, however, under one or more circumstances while the vehicle ignition system is ON. For example, the ECM may shut down the engine for operation in a sail mode. The ECM may shut down the engine for operation in the sail mode, for example, when an accelerator pedal position is zero (indicating that the driver is not depressing the accelerator pedal) and the vehicle speed is greater than a predetermined speed. By shutting down the engine, the engine does not consume fuel as the vehicle decelerates.

The ECM may also shut down the engine throughout an auto-stop portion of an auto-stop/start event. The ECM may shut down the engine for an auto-stop portion of an auto-stop/start event, for example, when the vehicle speed is zero (or less than a predetermined speed) and the driver is depressing the brake pedal of the vehicle. The ECM may re-start the engine for an auto-start portion of the auto-stop/start event, for example, when the driver releases the brake pedal. By shutting down the engine, the engine does not consume fuel while the vehicle is stopped and the driver is depressing the brake pedal.

A driver of the vehicle may expect to experience engine sound and/or vibration, however, while the engine is shut down. According to the present disclosure, an audio control module of the vehicle outputs engine sound via one or more speakers while the engine is shut down. For example, the audio control module outputs engine sound via the one or more speakers while the engine is OFF during operation in the sail mode and during the auto-stop portion of auto-stop/start events. This generates audible and/or tactile feedback that a driver may expect at times when the engine is shut down and not generating sound.

Figure 1:
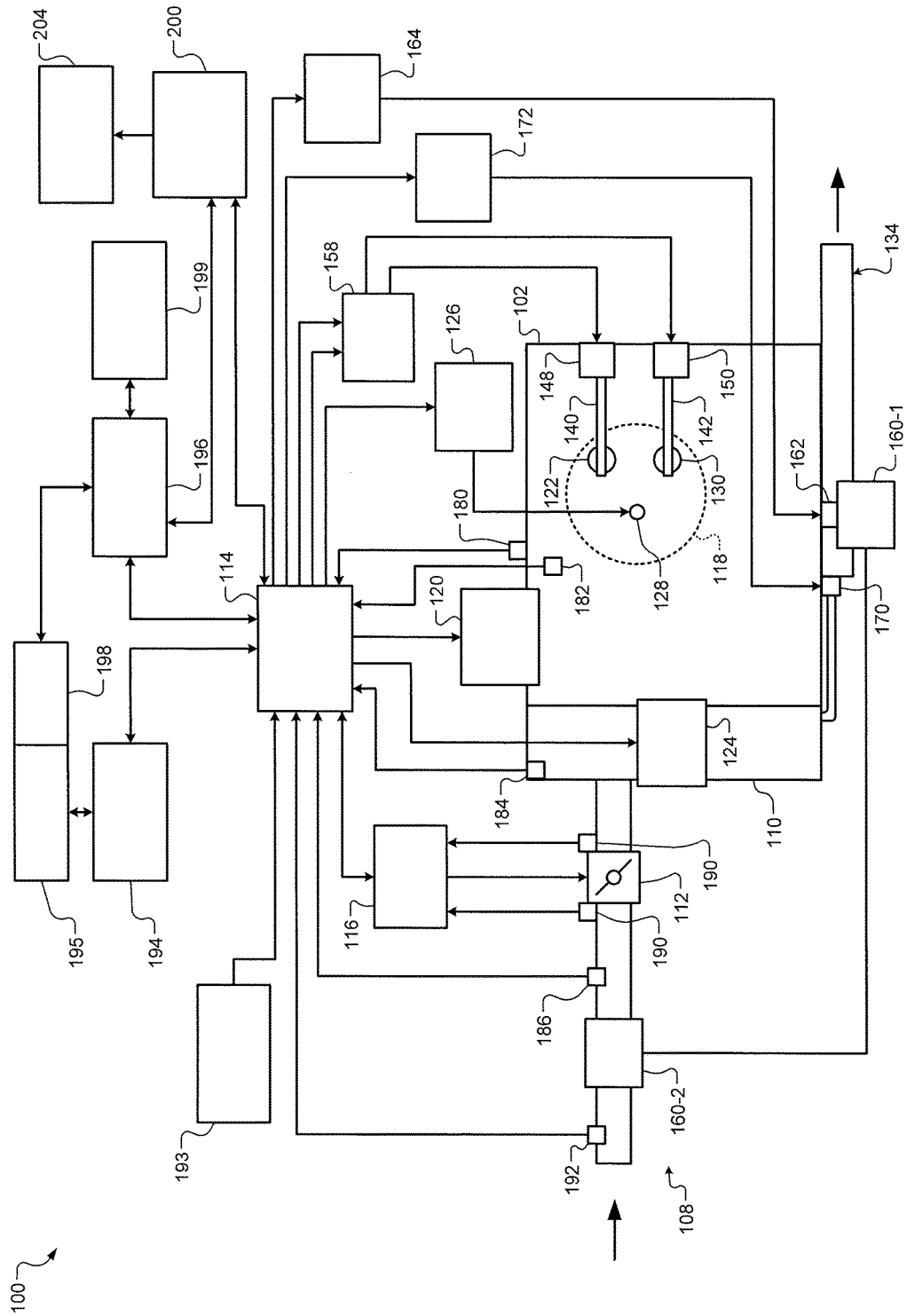
FIG. 1 is a functional block diagram including an example powertrain system of a vehicle.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and a motor generator unit (MGU) 198. While the example of one MGU is provided, multiple MGUs and/or electric motors may be implemented. The terms MGU and electric motor may be interchangeable in the context of the present application, drawings, and claims. In various implementations, various functions of the ECM 114, the transmission control module 194, and the hybrid control module 196 may be integrated into one or more modules.

Each system of the engine 102 that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the MGU 198 to output torque, for example, to supplement engine torque output. For example, the hybrid control module 196 may control the MGU 198 to output (positive) torque when the torque request is greater than a predetermined torque, when the APP is greater than a predetermined position, or when the driver is rapidly depressing the accelerator pedal. The predetermined torque may be calibrated and may be, for example, at least a predetermined fraction of a maximum possible torque output of the engine 102 under the present operating conditions. The predetermined fraction may be calibratable, is greater than zero, and may be, for example, approximately 80 percent, approximately 90 percent, or another suitable value that is greater than 50 percent of the maximum possible torque output of the engine 102.

The hybrid control module 196 applies electrical power from a battery 199 to the MGU 198 to cause the MGU 198 to output positive torque. While the example of the battery 199 is provided, more than one battery may be used to supply power to the MGU 198. The MGU 198 may output torque, for example, to the engine 102, to an input shaft of the transmission 195, to an output shaft of the transmission 195, or to another torque transfer device of the powertrain of the vehicle. The battery 199 may be dedicated for the MGU 198 and one or more other batteries may supply power for other vehicle functions.

Under other circumstances, the hybrid control module 196 may control the MGU 198 to convert mechanical energy of the vehicle into electrical energy. The hybrid control module 196 may control the MGU 198 to convert mechanical energy into electrical energy, for example, to recharge the battery 199. This may be referred to as regeneration.

The vehicle also includes an audio control module 200 that controls sound output via speakers 204. The speakers 204 may be located and output sound to within the passenger cabin of the vehicle. However, one or more of the speakers 204 may be implemented at another location, such as in the exhaust system 134. The audio control module 200 may control the speakers 204 to output sound based on received amplitude modulation (AM) signals, received frequency modulation (FM) signals, received satellite signals, and other types of audio signals. The audio control module 200 may be implemented, for example, with an infotainment system.

Under some circumstances, the audio control module 200 additionally or alternatively control the sound output via the speakers 204 to generate engine sound while the engine 102 is off. For example, as discussed further below, the audio control module 200 may generate engine sound via the speakers 204 while the engine 102 is off for operation in the sail mode and during an auto-stop portion of an auto-stop/start event.

Auto-stop/start events include an auto-stop portion (operation in an auto-stop mode) and an auto-start portion (operation in an auto-start mode). The ECM 114 controls auto-stop/start events. For the auto-stop portion of an auto-start/stop event, the ECM 114 shuts down the engine 102 when one or more predetermined enabling criteria are satisfied and the ignition system is ON. For example, the ECM 114 may initiate the auto-stop portion of an auto-stop/start event when a vehicle speed is zero (or less than a predetermined speed, such as 5 miles per hour) and the driver is depressing the brake pedal (e.g., BPP>0) while the ignition system is ON. The ECM 114 disables the injection of fuel and disables the provision of spark to shut down the engine 102 during the auto-stop portion of an auto-stop/start event. The transmission control module 194 also decouples the transmission 195 from the engine 102 (e.g., disengages a torque converter clutch) during the auto-stop portion of an auto-stop/start event.

The ECM 114 may initiate the auto-start portion of an auto-stop/start event when the driver is releases the brake pedal (e.g., BPP=0). For the auto-start portion of an auto-stop/start event, the ECM 114 may enable fueling, enable the provision of spark, engage a starter motor with the engine 102, and applying current to the starter motor to crank and start the engine 102.

The ECM 114 may initiate operation in the sail mode when the vehicle speed is greater than a predetermined speed that is greater than zero (e.g., 20 miles per hour) and a driver releases the accelerator pedal (e.g., APP=0). The ECM 114 disables the injection of fuel and disables the provision of spark to shut down the engine 102 during operation in the sail mode. The ECM 114 may maintain operation in the sail mode until the driver actuates the accelerator pedal (e.g., APP>0). The transmission control module 194 also decouples the transmission 195 from the engine 102 (e.g., disengages a torque converter clutch) during operation in the sail mode. The ECM 114 may enable fueling and spark to the engine 102 when sail mode operation ends. The vehicle speed may be measured using a sensor or determined based on one or more measured parameters, such as one or more wheel speeds.

The audio control module 200 may receive parameters from the ECM 114, the hybrid control module 196, the transmission control module 194, and/or one or more other control modules of the vehicle. The audio control module 200 may receive parameters from other modules, for example, via a car area network (CAN) bus or another type of network. As discussed further below, the audio control module 200 may determine when and the extent to which to output engine sound based on one or more of the received parameters.

Figure 2:
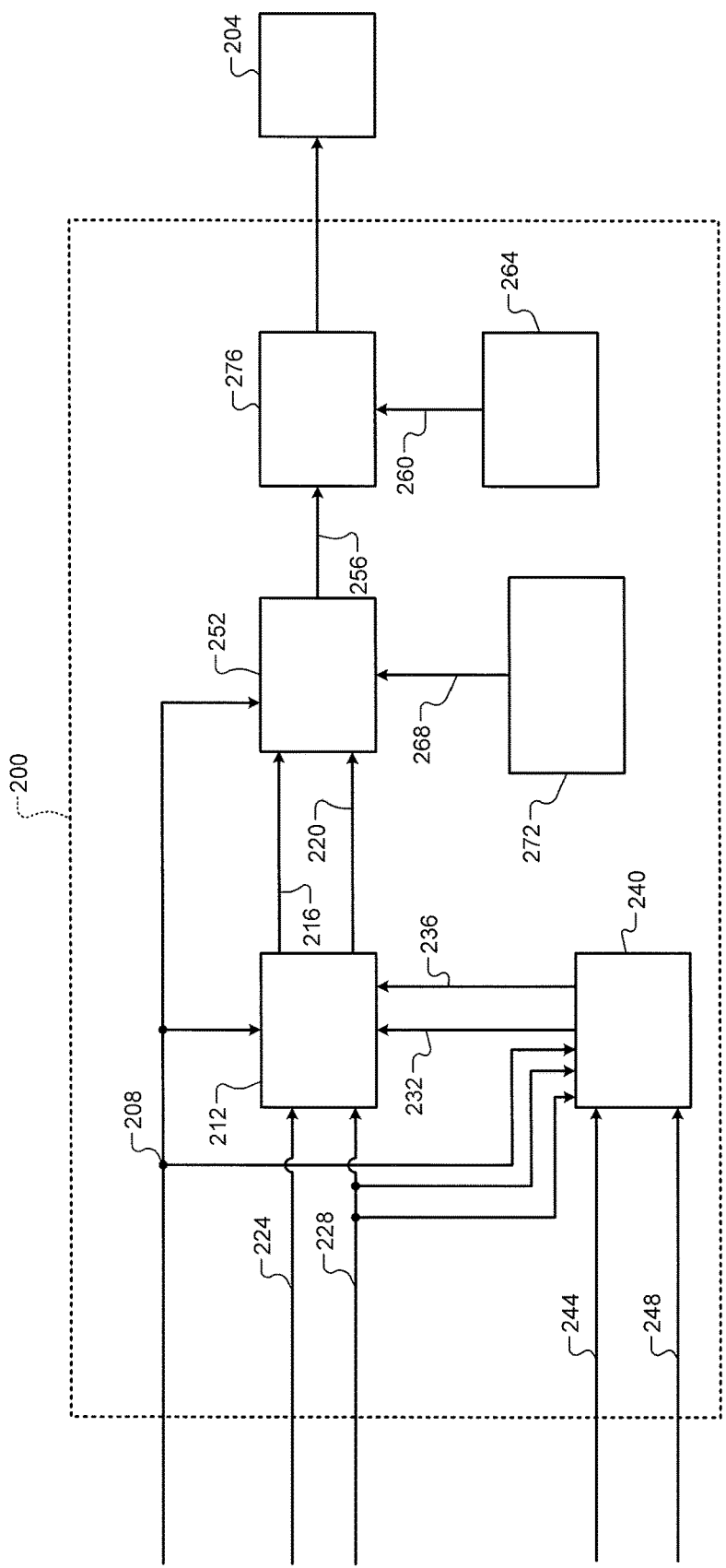
FIG. 2 is a functional block diagram including an example audio control module and speakers.

FIG. 2 is a functional block diagram of an example audio system including the audio control module 200 and the speakers 204. The speakers 204 output sound within the passenger cabin of the vehicle and/or at one or more other locations of the vehicle, such as at the exhaust system 134 of the vehicle.

Based on a mode 208 indicative of a present mode of operation of the engine 102 and the ECM 114, a selection module 212 sets a selected engine torque 216 and a selected engine speed 220 based on or to either: (i) a present engine torque 224 and a present engine speed 228, respectively; or (ii) a pseudo (artificial) engine torque 232 and a pseudo (artificial) engine speed 236, respectively. In other words, based on the mode 208, the selection module 212 sets the selected engine torque 216 based on or two either (i) the present engine torque 224 or (ii) the pseudo engine torque 232. The selection module 212 also, based on the mode 208, sets the selected engine speed 220 based on or to either (i) the present engine speed 228 or the pseudo engine speed 236.

The present engine speed 228 may be measured using a sensor or determined (e.g., by the ECM 114) based on changes in crankshaft position measured using the crankshaft position over a period between crankshaft positions. The present engine torque 224 may be measured using a sensor or determined based on one or more parameters using one or more equations and/or lookup tables that relate the parameter(s) to present engine torque.

A pseudo (artificial) parameter module 240 determines the pseudo engine torque 232 and the pseudo engine speed 236. The pseudo engine torque 232 at a given time corresponds to what the present engine torque 224 may be under the operating conditions at that time if the engine 102 was ON (instead of OFF). The pseudo engine speed 236 at a given time corresponds to what the present engine speed 228 may be under the operating conditions at that time if the engine 102 was ON (instead of OFF).

The pseudo parameter module 240 determines the pseudo engine torque 232 and the pseudo engine speed 236 based on the mode 208 and/or one or more other operating parameters. For example, when the mode 208 transitions to the sail mode, the pseudo parameter module 240 may set the pseudo engine torque 232 and the pseudo engine speed 236 to the present engine torque 224 and the present engine speed 228, respectively.

The pseudo parameter module 240 also captures a present vehicle speed 244 and a present gear of the transmission 195 when the mode 208 transitions to the sail mode. As the vehicle decelerates toward and two zero during operation in the sail mode, one or more gear shifts (downshifts) of the transmission 195 would normally be performed (by the transmission control module 194) when the present vehicle speed 244 reaches one or more predetermined speeds, respectively. If the engine 102 was ON during the gear shift(s), the present engine speed 228 and the present engine torque 224 would increase in response to the gear shift(s).

Therefore, while the mode 208 remains in the sail mode (and the engine 102 is therefore shut down), the pseudo parameter module 240 varies the pseudo engine speed 236 (starting from the present engine speed 228) and the pseudo engine torque 232 (starting from the present engine torque 224) based on how engine speed and engine torque would normally change as the vehicle decelerated and the gear shift(s). The pseudo parameter module 240 determines the vehicle speeds (or vehicle speed ranges) at which the gear shift(s) would occur based on the present vehicle speed 244 and the present gear of the transmission 195 at the time that the mode 208 transitioned to the sail mode. While the mode 208 is in the sail mode, the pseudo parameter module 240 increases the pseudo engine speed 236 and the pseudo engine torque 232 when the present vehicle speed 244 reaches a vehicle speed (or vehicle speed range) where a gear shift would occur. The pseudo parameter module 240 decreases the pseudo engine torque 232 and the pseudo engine speed 236 at vehicle speeds other than the vehicle speeds (or vehicle speed ranges) of gear shifts. The magnitude of the increases in the pseudo engine speed 236 and the pseudo engine torque 232 for a gear shift may be set based on a change in gear ratio of a gear shift. For example, the magnitudes may increase as the change in gear ratio increases and vice versa.

The present vehicle speed 244 may be measured using a sensor or determined based on one or more parameters. For example, the present vehicle speed 244 may be determined (e.g., by the ECM 114) based on one or more wheel speeds, such as an average of one or more wheel speeds measured using wheel speed sensor(s), respectively. A present gear 248 may be reported by the transmission control module 194. The present gear 248 may be a gear commanded by the transmission control module 194 or determined based on one or more parameters. For example, the transmission control module 194 may determine the present gear 248 based on a ratio of a transmission input shaft speed to a transmission output shaft speed. Transmission input shaft speed and transmission output shaft speed may be measured using transmission input shaft speed and transmission output shaft speed sensors, respectively.

When the mode 208 is set to the auto-stop mode, the pseudo parameter module 240 determines the pseudo engine torque 232 and the pseudo engine speed 236 based on the engine 102 idling and/or a predetermined idling speed of the engine 102. This is despite the engine 102 being shut down during the auto-stop portion of an auto-stop/start event. The pseudo parameter module 240 may set the pseudo engine torque 232 and the pseudo engine speed 236 to predetermined fixed values, respectively. Some natural (and minor) variation (away from the predetermined idling speed) may be expected in the present engine torque 224 and the present engine speed 228, however, when the engine 102 is idling. The pseudo parameter module 240 may therefore vary the pseudo engine torque 232 and the pseudo engine speed 236 according to predetermined engine torque and predetermined engine speed sequences for the engine 102 idling, which may be looped. Further details regarding the pseudo engine speed 236 and the pseudo engine torque 232 can be found, for example, in commonly assigned U.S. Pat. No. 9,227,566, titled "Pseudo-Tach Signal System for A Motor Vehicle," which is incorporated herein in its entirety.

The audio control module 200 receives the mode 208 from the ECM 114. The ECM 114 may set the mode 208, for example, to sail mode when the ECM 114 has shut down the engine 102 for operation in the sail mode. The ECM 114 may set the mode 208 to auto-stop mode when the ECM 114 has shut down the engine 102 during the auto-stop portion of an auto-stop/start event. The ECM 114 may set the mode 208 to an engine ON mode when the engine 102 is combusting air and fuel and generating torque. The ECM 114 may also set the mode 208 differently for one or more other different modes of operation.

When the mode 208 is set to the auto-stop mode (during the auto-stop portion of an auto-stop/start event), the selection module 212 sets the selected engine torque 216 based on or to the pseudo engine torque 232 and sets the selected engine speed 220 based on or to the pseudo engine speed 236. When the mode 208 is set to the sail mode, the selection module 212 sets the selected engine torque 216 based on or to the pseudo engine torque 232 and sets the selected engine speed 220 based on or to the pseudo engine speed 236. When the mode 208 is set to the engine ON mode, the selection module 212 sets the selected engine torque 216 based on or to the present engine torque 224 and sets the selected engine speed 220 based on or to the present engine speed 228.

The selection module 212 may rate limit changes in the selected engine torque 216 and the selected engine speed 220 to predetermined maximum amounts per control loop. For example, the selection module 212 may, by up to a predetermined maximum torque per control loop, adjust the selected engine torque 216 toward the selected one of the present engine torque 224 and the pseudo engine torque 232. By up to a predetermined maximum speed per control loop, the selection module 212 adjust the selected engine speed 220 toward the selected one of the present engine speed 228 and the pseudo engine speed 236. This may help blending of engine sound output, for example, when a change in the mode 208 occurs.

A sound control module 252 determines how to output engine sound via the speakers 204 based on the selected engine torque 216 and/or the selected engine speed 220. More specifically, the sound control module 252 sets characteristics 256 of one or more predetermined engine sounds 260 to output based on at least one of the selected engine torque 216 and the selected engine speed 220. For example, the predetermined engine sounds 260 may include one or more predetermined engine sounds to be output at or based on harmonics of a frequency corresponding to the selected engine speed 220 and one or more predetermined engine sound to be output at or based on harmonics of a frequency not corresponding to the selected engine speed 220.

The characteristics 256 may include, for example, one or more harmonics or orders of a base frequency at which to output each of the one or more predetermined engine sounds 260. The characteristics 256 may also include respective magnitudes for outputting each of the one or more predetermined engine sounds 260 at the respective harmonics or orders. In other words, for each of the one or more predetermined engine sounds 260, the sound control module 252 may set: one or more frequencies (e.g., harmonics or orders of the base frequency) at which to output that one of the predetermined engine sounds 260; and one or more magnitudes (for the one or more frequencies, respectively) for outputting that one of the predetermined engine sounds 260. The base frequency may be a predetermined fixed frequency, such as 110 Hz, or a variable, such as a frequency corresponding to the selected engine speed 220. Sound files of the predetermined engine sound(s) 260 (or tones) are stored in memory, such as in sound memory 264.

As stated above, the sound control module 252 sets the characteristics 416 based on at least one of the selected engine torque 216 and the selected engine speed 220. The sound control module 252 may set the characteristics 416 using one or more mappings (e.g., lookup tables) that relate selected engine speed and/or selected engine torque to frequencies and magnitudes for each of the predetermined engine sound(s) 260.

For example, the sound control module 252 may increase the number of frequencies (e.g., harmonics or orders of the base frequency) of one or more of the predetermined engine sounds 260 as the selected engine speed 220 increases and vice versa. As an example only, the sound control module 252 may set the characteristics 256 to output one of the predetermined engine sounds 260 at three different harmonics of the base frequency when the selected engine speed 220 is a first speed. The sound control module 252 may set the characteristics 256 to output the one of the predetermined engine sounds 260 at four or more different harmonics of the base frequency when the selected engine speed 220 is a second speed that is greater than the first speed.

Additionally or alternatively, the sound control module 252 may increase one or more frequencies (e.g., harmonics or orders of the base frequency) of one or more of the predetermined engine sounds 260 as the selected engine speed 220 increases and vice versa. As an example only, the sound control module 252 may set the characteristics 256 to output one of the predetermined engine sounds 260 at first, third, and fifth harmonics when the selected engine speed 220 is a first speed. The sound control module 252 may set the characteristics 256 to output the one of the predetermined engine sounds 260 at, for example, first, third, and sixth harmonics of the base frequency, at second, third, and sixth harmonics of the base frequency, or at one or more other harmonics that are greater than those used for the first speed when the selected engine speed 220 is a second speed that is greater than the first speed.

Additionally or alternatively, the sound control module 252 may increase the number of frequencies (e.g., harmonics or orders of the base frequency) of one or more of the predetermined engine sounds 260 as the selected engine torque 216 increases and vice versa. As an example only, the sound control module 252 may set the characteristics 256 to output one of the predetermined engine sounds 260 at three different harmonics of the base frequency when the selected engine torque 216 is a first torque. The sound control module 252 may set the characteristics 256 to output the one of the predetermined engine sounds 260 at four or more different harmonics of the base frequency when the selected engine torque 216 is a second torque that is greater than the first torque.

Additionally or alternatively, the sound control module 252 may increase one or more frequencies (e.g., harmonics or orders of the base frequency) of one or more of the predetermined engine sounds 260 as the selected engine torque 216 increases and vice versa. As an example only, the sound control module 252 may set the characteristics 256 to output one of the predetermined engine sounds 260 at first, third, and fifth harmonics when the selected engine torque 216 is a first torque. The sound control module 252 may set the characteristics 256 to output the one of the predetermined engine sounds 260 at, for example, first, third, and sixth harmonics of the base frequency, at second, third, and sixth harmonics of the base frequency, or at one or more other harmonics that are greater than those used for the first torque when the selected engine torque 216 is a second torque that is greater than the first torque.

Additionally or alternatively, the sound control module 252 may increase the magnitude for outputting one or more of the predetermined engine sounds 260 at one or more frequencies (e.g., harmonics or orders of the base frequency) as the selected engine speed 220 increases and vice versa. As an example only, the sound control module 252 may set the characteristics 256 to output one of the predetermined engine sounds 260 at a first magnitude at a first harmonic of the base frequency when the selected engine speed 220 is a first speed. The sound control module 252 may set the characteristics 256 to output the one of the predetermined engine sounds 260 at a second magnitude (greater than the first magnitude) at the first harmonic of the base frequency when the selected engine speed 220 is a second speed that is greater than the first speed. While the example of increasing one magnitude of one frequency for one of the predetermined engine sounds 260 is provided, the sound control module 252 may increase the magnitude for one or more of the frequencies for one or multiple of the predetermined engine sounds 260.

Additionally or alternatively, the sound control module 252 may increase the magnitude for outputting one or more of the predetermined engine sounds 260 at one or more frequencies (e.g., harmonics or orders of the base frequency) as the selected engine torque 216 increases and vice versa. As an example only, the sound control module 252 may set the characteristics 256 to output one of the predetermined engine sounds 260 at a first magnitude at a first harmonic of the base frequency when the selected engine torque 216 is a first torque. The sound control module 252 may set the characteristics 256 to output the one of the predetermined engine sounds 260 at a second magnitude (greater than the first magnitude) at the first harmonic of the base frequency when the selected engine torque 216 is a second torque that is greater than the first torque. While the example of increasing one magnitude of one frequency for one of the predetermined engine sounds 260 is provided, the sound control module 252 may increase the magnitude for one or more of the frequencies for one or multiple of the predetermined engine sounds 260.

The sound control module 252 may also set the characteristics 256 for generating the predetermined engine sound(s) 260 based on one or more randomization parameters 268 when the mode 208 is in the auto-stop mode and/or when the mode 208 is in the sail mode. The randomization parameters 268 may include, for example, one or more one or more additional harmonics or orders of the base frequency at which to output one or more of the predetermined engine sounds 260. The randomization parameters 268 may additionally or alternatively include, for example, one or more increases or decreases (e.g., scalars) for respective magnitudes for outputting the one or more predetermined engine sounds 260 at the respective harmonics or orders.

A randomization module 272 provides the randomization parameters 268, for example, based on a Chaos function or another suitable randomization function. One example Chaos function is a double pendulum Chaos function, although another type of randomization function may be used.

The randomization module 272 may execute the randomization function and provide the randomization parameters 268 during vehicle operation. Alternatively, a randomization equation may be executed during vehicle design, and a predetermined number of sets of the resulting randomization parameters may be stored in memory. The randomization module 272 may retrieve a set of these stored randomization parameters for each control loop when the mode 208 is in the auto-stop mode or the sail mode and used as the randomization parameters 268. A set may be selected out of all of the sets, for example, in a predetermined order or randomly.

Figure 3:
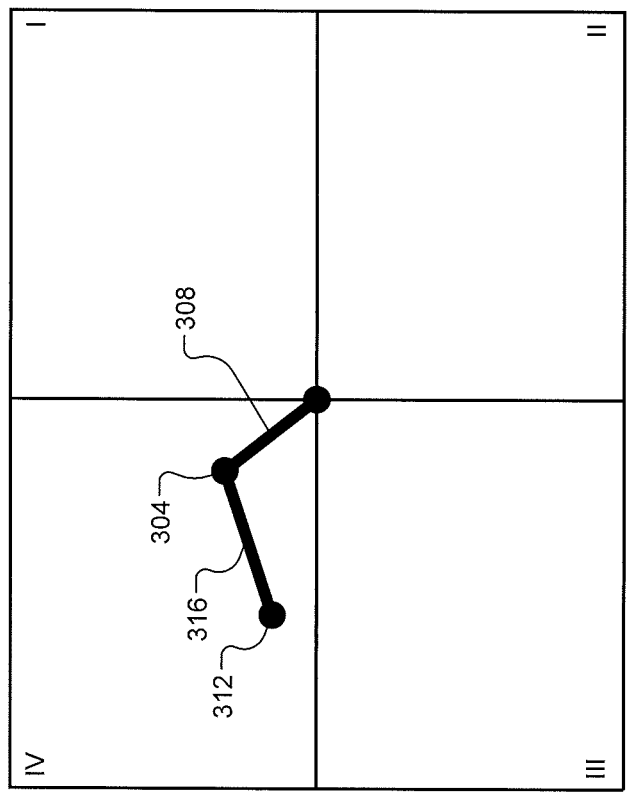
FIG. 3 includes an example coordinate system and one example position of a double pendulum of a Chaos function.

FIG. 3 includes an example coordinate system and one example position of a double pendulum of a Chaos function. The double pendulum moves randomly within the circle defined by a radius of the double pendulum based on the Chaos function. One or more characteristics of the double pendulum may be used to determine the randomization parameters 268. For example, the randomization module 272 may determine one or more frequencies (in addition to the frequencies determined based on the selected engine speed 220 and/or the selected engine torque 216) for outputting one of the predetermined engine sounds 260 based on a first endpoint 304 of a first section 308 of the double pendulum. The randomization module 272 may determine the frequencies to add, for example, using an equation or a lookup table that relates first endpoints (locations) additional frequencies.

As another example, the randomization module 272 may determine the magnitude of one, more than one, or all of the predetermined engine sounds 260 to be output based on a second endpoint 312 of a second section 316 of the double pendulum. The sound control module 252 may determine the magnitude, for example, using an equation or a lookup table that relates second endpoints (locations) to magnitude. While the example of a double pendulum is provided, a pendulum having a greater number of sections, another Chaos function, or another randomization function may be used may be used. Also, while the example of use of the endpoints is provided, other characteristics of the double pendulum, a single pendulum, or another suitable chaos function may be used.

Generally speaking, loudness of an output sound may increase as the number of frequencies used increases and/or as the magnitude of one or more frequencies used increases. Loudness may decrease as the number of frequencies used decreases and/or the magnitude of one or more frequencies decreases.

An audio driver module 276 receives the characteristics 416 and the predetermined engine sound(s) 420. The audio driver module 276 applies power (e.g., from the one or more other batteries) to the speakers 204 to output the predetermined engine sound(s) 260 at the respective frequencies and magnitudes specified by the sound control module 252. Randomization provided by the randomization module 272 may aid a driver's perception of the sound output via the speakers 204 as natural engine sound as opposed to artificial sound. Outputting sound based on the pseudo engine speed 236 and/or the pseudo engine torque 232 may provide audible engine feedback that a driver may while the vehicle is stopped for an auto-stop and while the vehicle is decelerating during operation in the sail mode, despite the engine 102 being off during both auto-stops and sail mode operation.

Figure 4:
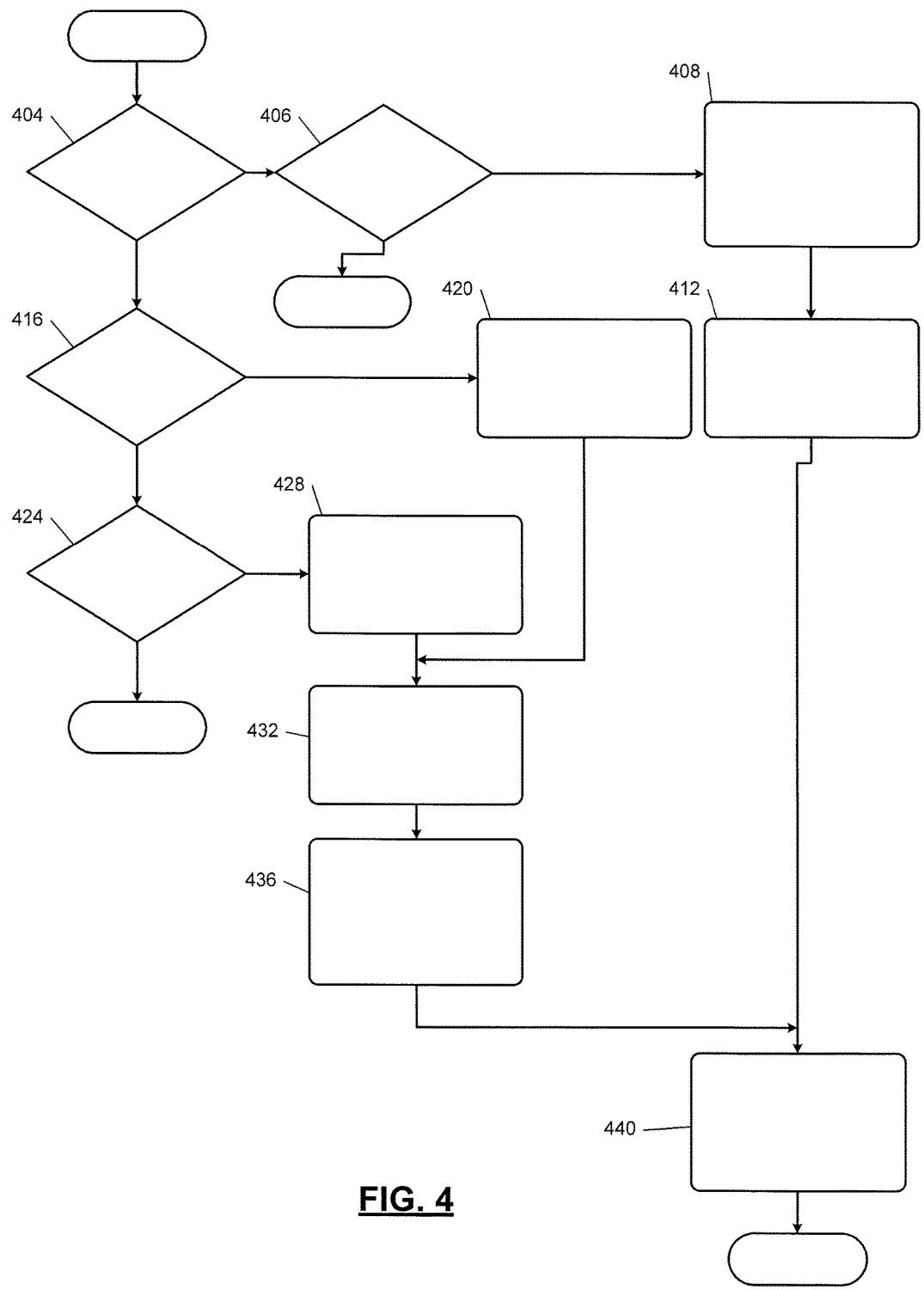
FIG. 4 is a flowchart depicting an example method of outputting engine sound.

Referring now to FIG. 4, a flowchart depicting an example method of outputting the predetermined engine sounds 260 is provided. Control may begin with 404 where the selection module 212 determines whether the engine 102 is on and combusting air and fuel to produce torque. For example, the selection module 212 may determine whether the mode 208 is set to a mode where the engine 102 is on (e.g., not the sail mode or the auto-stop mode). If 404 is true, control continues with 406. At 406, If 404 is true, control continues with 406. At 406, the selection module 212 determines whether the mode 208 is transitioned to the sail mode since a last control loop. If 406 is false, control may end. The engine 102 is off and reaches the sail mode a predetermined period (or a predetermined number of control loops) after the mode 208 transitions to the sail mode. If 406 is true, the selection module 212 sets the selected engine torque 216 and the selected engine speed 220 based on or two the present engine torque 224 and the present engine speed 228, respectively, at 408. As discussed above, the selection module 212 may rate limit changes in the selected engine torque 216 and the selected engine speed 220. Control then continues with 412 where the sound control module 252 sets the characteristics 256 based on the selected engine torque 216 and the selected engine speed 220. Control continues with 440, which is discussed further below.

If 404 is false, control continues with 416. At 416, the selection module 212 determines whether the engine 102 is the sail mode. For example, the selection module 212 may determine whether the predetermined period (or the predetermined number of control loops) has passed since the mode 208 transitioned to the sail mode. If 416 is true, control continues with 420. At 420, the pseudo parameter module 240 determines the pseudo engine torque 232 and the pseudo engine speed 236 for operation in the sail mode. As discussed above, during operation in the sail mode, the pseudo parameter module 240 generally decreases the pseudo engine torque 232 and the pseudo engine speed 236 as the present vehicle speed 244 decreases. However, the pseudo parameter module 240 increases the pseudo engine torque 232 and the pseudo engine speed 236 when the present vehicle speed 244 reaches vehicle speeds (or vehicle speed ranges) where gear shifts would normally occur. Control continues with 432, which is discussed further below.

If 416 is false, control continues with 424. At 424, the selection module 212 determines whether the mode 208 is set to the auto-stop mode. If 424 is true, at 428 the pseudo parameter module 240 determines the pseudo engine torque 232 and the pseudo engine speed 236 to replicate engine idling. For example, the pseudo parameter module 240 may set the pseudo engine torque 232 and the pseudo engine speed 236 to predetermined fixed values, respectively, or using predetermined engine torque and predetermined engine speed sequences for the engine 102 idling, respectively. Control then continues with 432.

At 432, the selection module 212 sets the selected engine torque 216 and the selected engine speed 220 based on or two the pseudo engine torque 232 and the pseudo engine speed 236, respectively. As discussed above, the selection module 212 may rate limit changes in the selected engine torque 216 and the selected engine speed 220. Control then continues with 412 where the sound control module 252 sets the characteristics 256 based on the selected engine torque 216 and the selected engine speed 220. The sound control module 252 further sets the characteristics 256 based on the randomization parameters 268 at 436. Control continues with 440. At 440, the audio driver module 276 applies power to the speakers 204 to output the predetermined engine sound(s) 260 at the respective frequencies and magnitudes specified by the sound control module 252. While the example of FIG. 4 is shown and discussed as ending, FIG. 4 is illustrative of one control loop and control may return to 404 for a next control loop. Control loops may be executed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An audio control system of a vehicle, comprising:
a selection module that:
when an engine is combusting air and fuel within cylinders of the engine, sets at least one of:
(i) a selected torque based on a present torque output of the engine; and
(ii) a selected engine speed based on a present engine speed; and,
when the engine is off and not combusting fuel for one of (a) an auto-stop portion of an auto-stop/start event and (b) operation in a sail mode, sets at least one of:
(i) the selected torque based on a pseudo torque output of the engine; and
(ii) the selected engine speed based on a pseudo engine speed determined for the one of (a) the auto-stop portion of the auto-stop/start event and (b) the operation in the sail mode;
a sound control module that, based on the at least one of the selected engine speed and the selected torque, sets at least one of:
(i) a frequency at which to output a predetermined engine sound; and
(ii) a magnitude for outputting the predetermined engine sound at the frequency; and
an audio driver module that applies power to at least one speaker of the vehicle to output the predetermined engine sound at the frequency and the magnitude.

2. The audio control system of claim 1 wherein, during the one of (a) the auto-stop portion of the auto-stop/start event and (b) the operation in the sail mode, the sound control module sets at least one of the frequency and the magnitude further based on a randomization parameter determined based on a randomization function.

3. The audio control system of claim 2 wherein the randomization function is a Chaos function.

4. A system of the vehicle, comprising:
the audio control system of claim 1; and
an engine control module that initiates the operation in the sail mode when a vehicle speed is greater than a predetermined speed that is greater than zero and an accelerator pedal position is in a predetermined position indicative of an accelerator pedal not being depressed, and that disables fueling of the engine during operation in the sail mode.

5. A system of the vehicle, comprising:
the audio control system of claim 1; and
an engine control module that initiates the auto-stop portion of the auto-stop/start event when a vehicle speed is zero and a brake pedal position is not in a predetermined position indicative of a brake pedal not being depressed, and that disables fueling of the engine during operation in the auto-stop portion of the auto-stop/start event.

6. The audio control system of claim 1 further comprising a pseudo parameter module that, during the auto-stop portion of the auto-stop/start event, sets at least one of the pseudo engine torque and the pseudo engine speed based on at least one of a predetermined idle engine speed and a predetermined idle engine torque.

7. The audio control system of claim 1 further comprising a pseudo parameter module that, during the operation in the sail mode, selectively decreases at least one of the pseudo engine torque and the pseudo engine speed as a vehicle speed decreases.

8. The audio control system of claim 7 wherein the pseudo parameter module, during operation in the sail mode, selectively increases at least one of the pseudo engine torque and the pseudo engine speed when the vehicle speed is within a predetermined vehicle speed range associated with a gear shift of a transmission.

9. The audio control system of claim 1 wherein the sound control module:
when the selected engine speed is a first engine speed, sets the:
(i) the frequency at which to output the predetermined engine sound to a first frequency; and
(ii) the magnitude for outputting the predetermined engine sound at the frequency to a first magnitude; and
at least one of:
when the selected engine speed is a second engine speed that is less than the first engine speed, sets the:
(i) the frequency at which to output the predetermined engine sound to a second frequency that is less than the first frequency; and
(ii) the magnitude for outputting the predetermined engine sound at the frequency to a second magnitude; and
when the selected engine speed is a third engine speed that is greater than the first engine speed, sets the:
(i) the frequency at which to output the predetermined engine sound to a third frequency that is greater than the first frequency; and
(ii) the magnitude for outputting the predetermined engine sound at the frequency to a third magnitude.

10. The audio control system of claim 1 wherein the sound control module:
when the selected torque is a first torque, sets the:
(i) the frequency at which to output the predetermined engine sound to a first frequency; and
(ii) the magnitude for outputting the predetermined engine sound at the frequency to a first magnitude; and
at least one of:
when the selected torque is a second torque that is less than the first torque, sets the:
(i) the frequency at which to output the predetermined engine sound to a second frequency; and
(ii) the magnitude for outputting the predetermined engine sound at the frequency to a second magnitude that is less than the first magnitude; and
when the selected torque is a third torque that is greater than the first torque, sets the:
(i) the frequency at which to output the predetermined engine sound to a third frequency; and
(ii) the magnitude for outputting the predetermined engine sound at the frequency to a third magnitude that is greater than the first magnitude.

11. An audio control method for a vehicle, comprising:
when an engine is combusting air and fuel within cylinders of the engine, setting at least one of:
(i) a selected torque based on a present torque output of the engine; and
(ii) a selected engine speed based on a present engine speed; and, when the engine is off and not combusting fuel for one of
(a) an auto-stop portion of an auto-stop/start event and
(b) operation in a sail mode, setting at least one of:
(i) the selected torque based on a pseudo torque output of the engine; and
(ii) the selected engine speed based on a pseudo engine speed determined for the one of (a) the auto-stop portion of the auto-stop/start event and (b) the operation in the sail mode;
based on the at least one of the selected engine speed and the selected torque, setting at least one of:
(i) a frequency at which to output a predetermined engine sound; and
(ii) a magnitude for outputting the predetermined engine sound at the frequency; and
applying power to at least one speaker of the vehicle to output the predetermined engine sound at the frequency and the magnitude.

12. The audio control method of claim 11 wherein setting at least one of the frequency and the magnitude further includes, during the one of (a) the auto-stop portion of the auto-stop/start event and (b) the operation in the sail mode, setting at least one of the frequency and the magnitude further based on a randomization parameter determined based on a randomization function.

13. The audio control method of claim 12 wherein the randomization function is a Chaos function.

14. The audio control method of claim 11 further comprising:
initiating the operation in the sail mode when a vehicle speed is greater than a predetermined speed that is greater than zero and an accelerator pedal position is in a predetermined position indicative of an accelerator pedal not being depressed; and
disabling fueling of the engine during operation in the sail mode.

15. The audio control method of claim 11 further comprising:
initiating the auto-stop portion of the auto-stop/start event when a vehicle speed is zero and a brake pedal position is not in a predetermined position indicative of a brake pedal not being depressed; and
disabling fueling of the engine during operation in the auto-stop portion of the auto-stop/start event.

16. The audio control method of claim 11 further comprising, during the auto-stop portion of the auto-stop/start event, setting at least one of the pseudo engine torque and the pseudo engine speed based on at least one of a predetermined idle engine speed and a predetermined idle engine torque.

17. The audio control method of claim 11 further comprising, during the operation in the sail mode, selectively decreasing at least one of the pseudo engine torque and the pseudo engine speed as a vehicle speed decreases.

18. The audio control method of claim 17 further comprising, during operation in the sail mode, selectively increasing at least one of the pseudo engine torque and the pseudo engine speed when the vehicle speed is within a predetermined vehicle speed range associated with a gear shift of a transmission.

19. The audio control method of claim 11 further comprising:
when the selected engine speed is a first engine speed, setting the:
(i) the frequency at which to output the predetermined engine sound to a first frequency; and
(ii) the magnitude for outputting the predetermined engine sound at the frequency to a first magnitude; and
at least one of:
when the selected engine speed is a second engine speed that is less than the first engine speed, setting the:
(i) the frequency at which to output the predetermined engine sound to a second frequency that is less than the first frequency; and
(ii) the magnitude for outputting the predetermined engine sound at the frequency to a second magnitude; and
when the selected engine speed is a third engine speed that is greater than the first engine speed, setting the:
(i) the frequency at which to output the predetermined engine sound to a third frequency that is greater than the first frequency; and
(ii) the magnitude for outputting the predetermined engine sound at the frequency to a third magnitude.

20. The audio control method of claim 11 further comprising:
when the selected torque is a first torque, setting the:
(i) the frequency at which to output the predetermined engine sound to a first frequency; and
(ii) the magnitude for outputting the predetermined engine sound at the frequency to a first magnitude; and
at least one of:
when the selected torque is a second torque that is less than the first torque, setting the:
(i) the frequency at which to output the predetermined engine sound to a second frequency; and
(ii) the magnitude for outputting the predetermined engine sound at the frequency to a second magnitude that is less than the first magnitude; and
when the selected torque is a third torque that is greater than the first torque, setting the:
(i) the frequency at which to output the predetermined engine sound to a third frequency; and
(ii) the magnitude for outputting the predetermined engine sound at the frequency to a third magnitude that is greater than the first magnitude.

* * * * *